United States Patent [19]
Schenk et al.

[11] Patent Number: 5,927,825
[45] Date of Patent: Jul. 27, 1999

[54] ELECTRO-HYDRAULIC BRAKE APPLY SYSTEM WITH EMULATOR LATCH

[75] Inventors: Donald Edward Schenk, Vandalia; Schuyler Scott Shaw, Dayton, both of Ohio

[73] Assignee: General Motors Corporation, Detroit, Mich.

[21] Appl. No.: 08/761,878

[22] Filed: Dec. 9, 1996

[51] Int. Cl.[6] .................................................. B60T 8/42
[52] U.S. Cl. ..................................... 303/115.2; 303/113.5
[58] Field of Search ............................ 303/116.4, 116.2, 303/115.2, 113.5, 113.1, 117.1, DIG. 1–2

[56] References Cited

U.S. PATENT DOCUMENTS

| | | | |
|---|---|---|---|
| 4,744,610 | 5/1988 | Arikawa | 303/113.5 |
| 5,000,523 | 3/1991 | Mikhaeil-Boules et al. | 303/115.2 |
| 5,029,950 | 7/1991 | Vennemeyer et al. | 303/115.2 |
| 5,042,885 | 8/1991 | Villec | 303/115.2 |
| 5,147,117 | 9/1992 | Quinn | 303/115.2 |
| 5,163,744 | 11/1992 | Tierney et al. | 303/115.2 |
| 5,246,283 | 9/1993 | Shaw et al. | 303/115.2 |
| 5,308,154 | 5/1994 | Matouka | 303/115.2 |

*Primary Examiner*—Matthew C. Graham
*Attorney, Agent, or Firm*—Jeffrey A. Sedlar; Robert M. Sigler

[57] ABSTRACT

An electro-hydraulic brake apply system includes an emulator that effects pedal feel simulation by allowing compliance at a selective variable rate. This provides a vehicle driver with the preferred pedal travel and feedback characteristics of a conventional master cylinder/power booster apply system. As a secondary function, the emulator is utilized to latch the modulator. This locks the modulator apply piston in place when electrical power is removed from the drive motor. Further, the emulator operates to hydraulically isolate the master cylinder from the wheel brakes during normal system operation.

7 Claims, 2 Drawing Sheets

ELECTRO-HYDRAULIC BRAKE APPLY SYSTEM WITH EMULATOR LATCH

TECHNICAL FIELD

The present invention relates to an electro-hydraulic brake apply system with an emulator latch and more particularly, to an electro-hydraulic brake apply system with a movable piston modulator wherein the piston is selectively latched in a non-movable condition by operation of a brake pedal feel emulator.

BACKGROUND OF THE INVENTION

Electro-hydraulic brake apply systems are known wherein the pressure applied to a vehicle's wheel brakes is controlled by a electronic unit that evaluates several parameters and delivers a control signal to a hydraulic modulator that sets the wheel brake pressure. A key parameter used to determine the appropriate braking pressure at the wheel brake is the driver's command, delivered as an input on the brake pedal. Generally, a pressure sensor monitors wheel brake pressure providing feedback to the control system for use in setting the braking pressure.

A typical hydraulic modulator includes a pressure generation mechanism and a means of controlling delivery of the generated pressure to the wheel brakes. This may take the form of a pump and proportional hydraulic valve, a pump with a pair of two way valves or a movable piston variable pressure chamber device. The number and arrangement of these elements included in a braking system is determined by the system layout and selected control scheme.

With a movable piston variable chamber device, a piston is driven linearly in a bore to vary the size of a pressure chamber. The pressure chamber is connected to a brake line leading to the wheel brake. For an application of braking pressure, the size of the variable chamber is reduced, to take up compliance in the system, and to increase braking pressure. The piston applies an increased force to the contained non-compressible fluid to apply the brake. To decrease braking pressure, the force on the piston is reduced and when appropriate, the size of the variable chamber is increased to release the brake. With this type of operation it is preferable to latch the piston in position for various operating requirements.

One known method of latching the piston includes the use of an electro-magnetic brake that when engaged, prevents rotation of a motor that drives the piston through an interposed drivetrain. An electromagnetic brake type latch uses frictional engagement with the motor's rotor to lock the rotor in position and thereby, prevent movement of the piston. To allow movement of the piston, the electromagnetic brake is disengaged. Engagement and disengagement of the latch is controlled by an electronic unit.

SUMMARY OF THE INVENTION

The present invention provides an alternative to the aforementioned apply system latch by using an emulator as the latch effecting device. An emulator operates in an electro-hydraulic or brake-by-wire system to effect pedal feel simulation by allowing compliance at a selective, variable rate. This provides the driver with the preferred pedal travel and feedback characteristics of a conventional master cylinder/power booster apply system. As a secondary function, the present invention utilizes the emulator to latch the modulator. This allows elimination of the electromagnetic brakes while utilizing a component that is otherwise already included in the system. A multi-functional emulator that provides feel and operates to latch the modulator may also render additional components such as normally open solenoid valves used to isolate the master cylinder unnecessary, affording an increased benefit.

According to a preferred embodiment of the present invention, when the driver applies force to the brake pedal, fluid pressure is generated in a master cylinder. When preferable, the fluid pressure is deliverable to the wheel brakes to effect vehicle braking. To effect brake actuation with the master cylinder generated pressure, a normally open hydraulic circuit is provided between the master cylinder and the wheel, through the emulator. However, in the typical power mode of operation of the system, the master cylinder is isolated from the wheel brakes and the fluid pressure operates on the emulator.

The emulator allows displaced fluid and pressure generated in the master cylinder to act on a moveable piston. The piston moves in its bore and blocks the normally open hydraulic circuit between the master cylinder and the wheel brake. As additional force is applied to the pedal, increased pressure output from the master cylinder is sensed by a pressure transducer. The fluid pressure information is delivered to an electronic controller that effects operation of the modulator to generate braking pressure. Motor torque is delivered in proportion to the amount of pedal force.

The motor is connected to a ball screw drive assembly by an interposed geartrain. The ball screw drive effects linear translation of a piston that contains a variable chamber. A continuously open hydraulic circuit is provided between the variable chamber and the wheel brake. As the motor applies torque to the geartrain, the ball screw drive moves the piston displacing fluid and effecting a resultant increase or decrease in braking pressure. The pressure level is modulated by increasing or decreasing motor torque depending on the command from the electronic controller.

According to this preferred embodiment, as the modulator piston moves through the bore in a brake apply direction, an annular chamber behind the piston fills with fluid from the master cylinder reservoir. A normally closed solenoid is disposed in a conduit from the reservoir to the annular chamber and is held open during power modulator operation. When selected, the normally closed solenoid is closed or when the power signal to the modulator is absent, the normally closed solenoid automatically closes.

This latches the modulator by trapping hydraulic fluid in the annular chamber which prevents fluid pressure in the variable chamber form moving the piston. Pressure is maintained at the wheel brake as a result.

With pressure at the wheel brake maintained by the latch, if force on the brake pedal is fully released, the system is unlatched and the wheel brake is released. The emulator piston automatically returns to a released position reopening the hydraulic circuit between the master cylinder and the wheel brake. The wheel brake can then be directly actuated from the master cylinder. Manual operation of the wheel brake through the master cylinder occurs through the emulator, but without interjecting emulator travel or compliance effects.

DESCRIPTION OF THE PREFERRED EMBODIMENT

Figure 1:
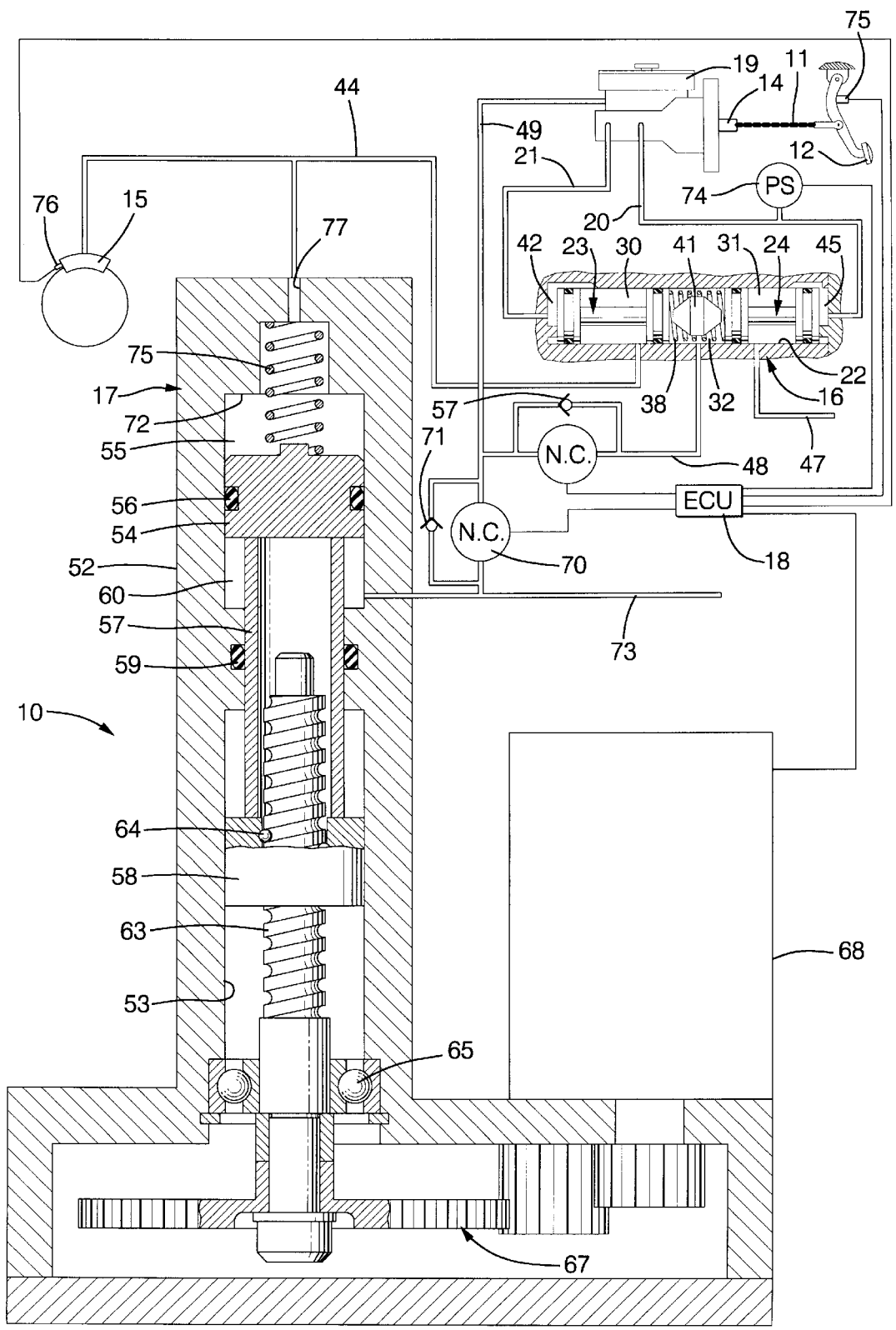
FIG. 1 is a schematic representation of an electro-hydraulic braking system with an emulator latch.

Referring to the drawings, illustrated in FIG. 1 is a braking system designated in the aggregate as 10. The braking system 10 utilizes electro-hydraulic brake apply technology similar to that disclosed in U.S. Pat. No. 5,246,283 which issued Sep. 21, 1993 and is commonly assigned. U.S. Pat. No. 5,246,283 is specifically incorporated herein by reference.

In general, the braking system 10 includes brake pedal 12, master cylinder 14, wheel brake 15, emulator 16, modulator 17 and controller 18. In operation of the braking system 10, the wheel brake 15 is actuated in response to a fluid pressure generated by the master cylinder 14 upon the application of force to brake pedal 12. In this mode of operation, the pressure generated by master cylinder 14 is transmitted through the emulator 16 to the wheel brake 15. Actuation of the wheel brakes through master cylinder generated pressure is provided as a secondary operating mode. Additionally, as a primary operating mode, the wheel brake 15 is responsive to pressure generated by the modulator 17 in response to actuation of the brake pedal 12. When preferable, the wheel brake(s) are applied in response to pressure generated by the modulator 12 independent of actuation of the brake pedal 12 and in response to the electronic controller 18.

With more specificity, brake pedal 12 is interconnected with the unboosted dual piston master cylinder 14 by a push rod 11. The master cylinder 14 carries a reservoir 19 which stores fluid and supplies the fluid requirements of the system. Two brake lines 20 and 21 extend from the master cylinder 14 to the emulator 16. The brake lines 20 and 21 communicate with conventionally known separately pressurizable chambers (not illustrated), within the master cylinder 14 to provide a split braking system arrangement.

Figure 2:
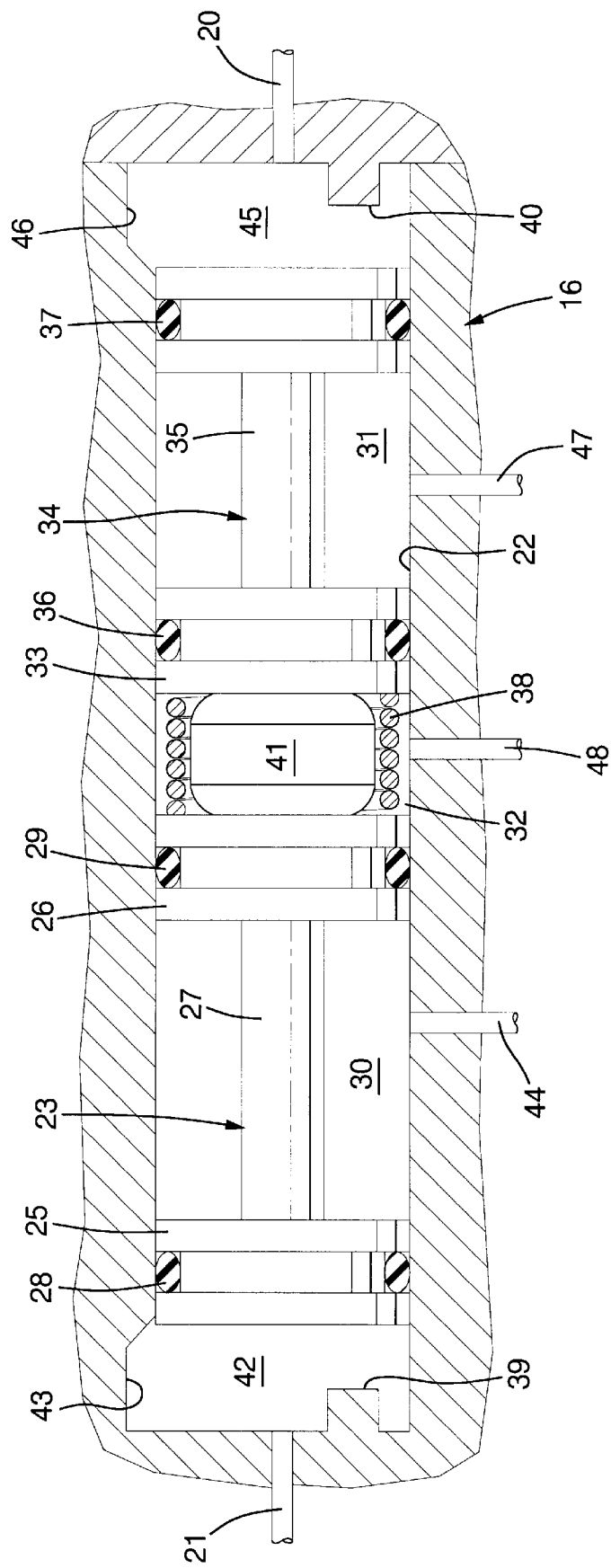
FIG. 2 is a detail fragmentary cross sectional illustration of the emulator of FIG. 1 shown in a latched condition.

The emulator 16 includes a bore 22 which carries two spool shaped pistons 23 and 24. With reference also directed to FIG. 2, piston 23 includes lands 25 and 26, which are connected by an undercut segment 27. Each of the lands 25 and 26 carries an annular seal 28 and 29, respectively. The seal 29 continuously bears against the wall of bore 22 providing fluid separation between the chambers 30 and 32. Similarly, the piston 24 includes lands 33 and 34 which are connected by an undercut segment 35. The land 33 carries an annular seal 36 and the land 34 carries an annular seal 37. The annular seal 36 continuously bears against the wall of bore 22 providing fluid separation between chambers 31 and 32.

Each of the chambers 30–32 is continuously filled with a typical substantially noncompressible hydraulic braking fluid. As illustrated in FIG. 1, in the normal position of the emulator 16, the coil spring 38 in chamber 32 separates the pistons 23 and 24 placing the piston 23 in engagement with the abutment 39 (referenced in FIG. 2), and placing the piston 24 in engagement with the abutment 40 (referenced in FIG. 2). A compressible resilient elastomeric element 41 is carried in the bore 22 and is surrounded by the coil spring 38. In the at-rest position illustrated in FIG. 1, clearance is provided so that the elastomeric element 41 does no apply a force to the pistons 23 and 24.

The brake line 21 communicates between the master cylinder 14 and chamber 42 of bore 22. The chamber 42 is in open fluid communication with the chamber 30 through groove 43 (referenced in FIG. 2), which is cut in emulator 16 within the bore 22. The chamber 30 is in continuously open fluid communication with the wheel brake 15 through the brake line 44. Similarly, the master cylinder 14 is in open fluid communication with the chamber 45 of bore 22 through the brake line 20. In the position illustrated in FIG. 1, the chamber 45 is in open fluid communication with the chamber 32 through groove 46 (referenced in FIG. 2), which is cut in emulator 16 within the bore 22. The chamber 31 is continuously open to brake line 47 which extends to an additional braking channel (not illustrated).

Within the emulator 16, the seals 29 and 36 maintain fluid communication between the two split channels of the braking system 10 that are supplied through the emulator 16 and the brake lines 44 and 47. Optionally, the pistons 23 and 24 are provided in two separate emulator units, rather than in the combined dual emulator 16. With the emulator 16, a conduit 48 extends from the chamber 32 to conduit 49, which extends between annular chamber 60 and reservoir 19. A normally closed solenoid valve 50, is positioned in the conduit 48 and includes an integral check valve 51 which continuously allows fluid flow through conduit 48 from conduit 49 to the chamber 32. The check valve 51 prevents fluid flow through conduit 48 from the chamber 32 to the conduit 49, so that flow is prevented when the normally closed solenoid 50 is in its normally closed condition.

With the solenoid 50 closed, when control signals from the electronic controller 18 are absent, the brake pedal 12 is effective in pressurizing the wheel brake 15 through the master cylinder 14. Upon the application of force to the brake pedal 12 the master cylinder 14 moves under operation of the push rod 11 pressurizing fluid in brake lines 21 and 20. From brake line 21 fluid pressure is transmitted to the chamber 42, and through groove 43 and chamber 30 of emulator 16, to the brake line 44. The brake line 44 transmits the fluid pressurization to the wheel brake 15 for actuation thereof. When the force is released from the brake pedal 12, fluid pressurization is relieved from the wheel brake 15 through the emulator 16 to the master cylinder 14 and excess fluid is returned to the reservoir 19. During this mode of operation, the pistons 23 and 24 are prevented from moving by fluid trapped in the chamber 32 by the normally closed valve 50.

The braking system 10 also includes the modulator 17. The modulator 17 has a body 52 formed of an acceptably rigid material. A bore 53 is formed in the body 52. A piston 54, with the assistance of a seal 56, sealingly separates off a variable chamber 55 within the bore 53 adjacent the end 72. The piston 54 is engaged with a cylinder 57 that extends within the bore 53 on the side of piston 54 opposite the variable chamber 55. The cylinder 57 is connected to a nut 58. A seal 59 is carried by the body 52 and bears against the cylinder 57.

The nut 58 is nonrotatably guided within the bore 53. The nut 58, and therefore, the interconnected piston 54, are driven linearly within the bore 53 by a rotatable ball screw 63 which interacts with the nut 58 through a plurality of ball bearings 64. The screw 63 is supported on the body 52 by a bearing 65 and is connected to a geartrain 67. The geartrain 67 is engaged with an electric motor 68 which applies torque to the system to linearly drive the piston 54.

The cylinder 57, in combination with the seals 56 and 59, defines the annular chamber 60 within the bore 53. The annular chamber 60 is connected to the conduit 49 which extends to the reservoir 19. A normally closed solenoid valve 70 is positioned in the conduit 49 and includes an integral check 71. When the normally closed solenoid 70 is in its normal position, the integral check 71 allows fluid to be drawn from the reservoir 19 to the annular chamber 60, thereby providing a means of backfilling the annular chamber 60 when the piston 54 moves toward the end 72 of bore 53. In addition, conduit 73 is connected to the conduit 49 and leads to an additional system modulator (not illustrated) like modulator 17.

The electronic controller 18 communicates with the normally closed solenoids 50 and 70, and the motor 78. Additionally, the electronic controller 18 communicates with a pressure transducer 74 provided in the brake line 20. The pressure transducer 74 monitors fluid pressure generated in the braking line 20 by the master cylinder 14. A brake pedal actuation switch 75 and wheel speed indicative sensor 76 also communicate with the electronic controller 18.

In the primary mode of operation, the braking system 10 functions such that the modulator 17 provides the braking pressure at wheel brake 15. Upon the actuation of brake pedal 12, the switch 75 closes, indicating to the electronic controller 18 that braking operation has been initiated. In response, the normally closed valves 50 and 70 are opened. This opens both the chamber 32 of the emulator 16 and the annular chamber 60 of modulator 17 to the reservoir 19. As movement of the brake pedal 12 is transferred to the master cylinder 14 through the push rod 11, the pressurization of brake lines 20 and 21 causes the pistons 23 and 24 to move to compress the spring 38 and the elastomeric element 41. During this mode of operation, the coil spring 38 and elastomeric element 41 provide compliance for the piston 23 to move, providing a preferred feel and travel characteristic at the pedal 12.

Referring to FIG. 2, the piston 23 is illustrated as moved into engagement with elastomeric element 41. This occurs after an initial amount of movement of the piston 23 is provided by operating against a relatively light load applied by spring 38. This closes the groove 43, sealing off chamber 30 from chamber 42. Therefore, the piston 23, specifically the land 25 and seal 28, isolates the master cylinder 14 from the brake line 44. Fluid from the chamber 32 is permitted to exit the emulator 16 through the conduits 48 and 49 and return to the reservoir 19 enabling movement of the piston 23.

Actuation of the brake pedal 12 and the master cylinder 14 generates a fluid pressure in the brake line 20 which is monitored by the pressure transducer 74 and communicated to the electronic controller 18 in the form of a pedal actuation representative signal. In response, the electronic controller 18 powers up the motor 68 to torque the modulator 17, driving the geartrain 67, screw 63 causing the nut 58, to linearly move the piston 54. This compresses the spring 75 and reduces the size of variable chamber 55. Fluid pressure generated by operation of the modulator 17 within the variable chamber 55 is communicated through the opening 77 to the brake line 44. In response, wheel brake 15 is actuated with a fluid pressure in proportion to the pressure generated by the master cylinder 14 and sensed by the pressure transducer 74.

As the piston 54 moves toward the end 72 of bore 53 pressurizing the braking circuit, fluid is drawn into the annular chamber 60 through the conduit 49 and the open, normally closed valve 70 from the reservoir 19. When it is preferable to latch the modulator 17 or when power to the motor 68 is lost, the normally closed solenoid 70 is closed trapping fluid in the annular chamber 60. When the modulator 17 is latched, and with force still being applied to the brake pedal 12, the pressure in brake line 21 maintains piston 23 in the position of FIG. 2 wherein the brake line 44 is cutoff from the brake line 21 by the emulator 16. Accordingly, the braking pressure in brake line 44 at the wheel brake 15 is maintained since the piston 54 is incapable of backdriving in the bore 53 due to the trapped fluid in the annular chamber 60.

When the brake pedal 12 is released, the master cylinder 14 permits fluid to return to the reservoir 19 through the brake line 21. The elastomeric element 41 and spring 38 along with the fluid pressure in annular chamber 60 drive the piston 23 back to the at-rest position as shown in FIG. 1. This opens communication between the chambers 30 and 42 of the emulator 16 through the groove 43. Therefore, fluid pressure in the wheel brake 15 and the brake line 44 is communicated back through the chambers 30 and 42 of emulator 16, and the brake line 21, to the master cylinder 14. The spring 75 maintains the position of the piston 54 away from the end 72 within the bore 53.

If operating power to the motor 68 remains absent, another application of force to the brake pedal 12 effects pressurization of the wheel brake 15 through the emulator 16, since chambers 30 and 42 remain in communication through the groove 43. When power operation is again provided, the electronic controller 18 powers up the motor 68 in response to application of force to the brake pedal 12 to effect braking pressure through the modular 17. Additionally, the electronic controller 18 is programmable for independently pressurizing the wheel brake 15 through the modulator 17 without input on the brake pedal 12.

What is claimed is:

1. A brake apply system for delivering fluid pressure to a wheel brake to selectively actuate the wheel brake in two separate modes of operation comprising:

a master cylinder wherein fluid pressure is generated in the master cylinder in response to a manual input on a brake pedal;

an emulator, wherein the emulator has a bore with a piston slidably carried in the bore, with a spring biasing the piston toward an end of the bore wherein a first chamber is defined in the bore on a first side of the piston and a second chamber is defined in the bore on a second side of the piston wherein the piston is spool shaped with a land of the piston adjacent each of the first and second chambers wherein a third chamber is defined between the lands and wherein the emulator includes a groove providing an opening between the first and third chambers when the piston is in an at-rest position;

a first conduit extending between the master cylinder and the first chamber;

a pressure transducer positioned in the first conduit;

a wheel brake;

a second conduit extending between the third chamber and the wheel brake so that a first mode of operation is provided wherein the first mode of operation is characterized by actuation of the wheel brake with fluid pressure generated by the master cylinder and delivered to the wheel brake through the first conduit, the emulator and the second conduit;

a modulator having a variable chamber;

a third conduit extending between the variable chamber and the wheel brake so that a second mode of operation is provided wherein the second mode of operation is characterized by actuation of the wheel brake with fluid pressure generated by the modulator and delivered to the wheel brake through the third conduit in relation to the a pressure resulting in the first conduit and sensed by the pressure transducer;

a fourth conduit extending between the second chamber and the modulator; and a normally closed valve positioned in the fourth conduit.

2. A brake apply system comprising:

a modulator including a body having a first bore with a first piston slidably disposed in the first bore and moveable from an at-rest position during a brake apply, with a first chamber defined on a first side of the first piston and a second chamber defined on a second side of the first piston;

a wheel brake in open fluid communication with the first chamber through a first conduit, a reservoir containing fluid;

a second conduit extending between the reservoir and the second chamber;

a first normally closed valve and a check valve disposed in the second conduit wherein when the first piston moves away from the at rest position, the first normally closed valve is opened so that the first piston draws fluid from the reservoir through the second conduit and into the second chamber and simultaneously, the first piston compresses fluid in the first chamber to generate a pressure in the first chamber that is communicated through the first conduit to the wheel brake, and with the first normally closed valve open, when the first piston moves toward the at-rest position the first piston forces fluid from the second chamber through the second conduit and into the reservoir, and wherein when the first normally closed solenoid is closed, movement of the first piston away from the at-rest position draws fluid from the reservoir through the second conduit and into the second chamber and simultaneously, the first piston compresses fluid in the first chamber to generate a pressure in the first chamber that is communicated through the first conduit to the wheel brake, and with the first normally closed valve closed, the modulator is latched, trapping fluid in the second chamber so that the first piston cannot move toward the at-rest position;

an emulator, wherein the emulator has a second bore with a second piston slidably carried in the second bore, with a spring biasing the second piston toward an end of the second bore wherein a first chamber is defined in the second bore on a first side of the second piston and a second chamber is defined in the second bore on a second side of the second piston;

a master cylinder;

a third conduit extending between the master cylinder and the first chamber of the emulator;

a fourth conduit extending between the second chamber of the emulator and the reservoir; and a second normally closed valve disposed in the fourth conduit;

wherein when the second normally closed valve is closed, fluid is trapped in the second chamber and the second piston is substantially immovable in the emulator.

3. A brake apply system according to claim 2 wherein the second piston of the emulator is spool shaped with a land adjacent each of the first and second chambers wherein a third chamber is defined between the lands and further comprising a fifth conduit extending between the third chamber and the wheel brake and wherein a groove in the emulator provides an opening between the first and third chambers when the second piston is in the at rest position so that fluid pressure generated by the master cylinder is communicable to the wheel brake through the groove.

4. A brake apply system according to claim 3 wherein when the second normally closed valve is open, the second chamber is open to the reservoir through the fourth conduit so that fluid pressure generated in the master cylinder causes the second piston to compress the spring closing off the groove so that the master cylinder is isolated from the wheel brake and wherein movement of the second piston provides a compliance in the brake apply system.

5. A brake apply system comprising:

a modulator including a body having a first bore with a first piston slidably disposed in the first bore and moveable from an at-rest position during a brake apply, with a first chamber defined on a first side of the first piston and a second chamber defined on a second side of the first piston, wherein a spring applies a bias to the first side of the first piston and the second side of the piston is interconnected with a screw drive mechanism wherein the screw drive mechanism is operable to apply a force to the piston to compress the spring and move the first piston from the at-rest position;

a wheel brake in open fluid communication with the first chamber through a first conduit;

a reservoir containing fluid;

a second conduit extending between the reservoir and the second chamber;

a first normally closed valve and a check valve disposed in the second conduit wherein when the screw drive mechanism moves the first piston away from the at rest position, the first normally closed valve is opened so that the first piston draws fluid from the reservoir through the second conduit and into the second chamber and simultaneously, the first piston compresses fluid in the first chamber to generate a pressure in the first chamber that is communicated through the first conduit to the wheel brake, and with the first normally closed valve open, when the first piston moves toward the at-rest position the first piston forces fluid from the second chamber through the second conduit and into the reservoir and wherein when the first normally closed solenoid is closed, when the screw drive mechanism moves the first piston away from the at-rest position, the first piston draws fluid from the reservoir through the second conduit and into the second chamber and simultaneously, the first piston compresses fluid in the first chamber to generate a pressure in the first chamber that is communicated through the first conduit to the wheel brake, and with the first normally closed valve closed, the modulator is latched, trapping fluid in the second chamber so that the first piston cannot move toward the arrest position;

an emulator, wherein the emulator has a second bore with a second piston slidably carried in the second bore, with a spring biasing the second piston toward an end of the second bore wherein a first chamber is defined in the second bore on a first side of the second piston and a second chamber is defied in the second bore on a second side of the second piston;

a master cylinder;

a third conduit extending between the master cylinder and the first chamber of the emulator;

a fourth conduit extending between the second chamber of the emulator and the reservoir; and a second normally closed valve disposed in the fourth conduit;

wherein when the second normally closed valve is closed, fluid is trapped in the second chamber and the second piston is substantially immovable in the emulator.

6. A brake apply system according to claim 5 wherein the second piston of the emulator is spool shaped with a land adjacent each of the first and second chambers wherein a third chamber is defined between the lands and further comprising a fifth conduit extending between the third chamber and the wheel brake and wherein a groove in the emulator provides an opening between the first and third chambers when the second piston is in the at rest position so that fluid pressure generated by the master cylinder is communicable to the wheel brake through the groove.

7. A brake apply system according to claim 6 wherein when the second normally closed valve is open, the second chamber is open to the reservoir through the fourth conduit so that fluid pressure generated in the master cylinder causes the second piston to compress the spring closing off the groove so that the master cylinder is isolated from the wheel brake and wherein movement of the second piston provides a compliance in the brake apply system.

* * * * *